US010072935B2

(12) United States Patent
Vasgaard et al.

(10) Patent No.: US 10,072,935 B2
(45) Date of Patent: Sep. 11, 2018

(54) APPARATUS AND METHOD FOR TRACKING CARTS IN A SHOPPING SPACE

(71) Applicant: Wal-Mart Stores, Inc., Bentonville, AR (US)

(72) Inventors: Aaron J. Vasgaard, Rogers, AR (US); Matthew A. Jones, Bentonville, AR (US); Nicholaus A. Jones, Fayetteville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 30 days.

(21) Appl. No.: 15/423,095

(22) Filed: Feb. 2, 2017

(65) Prior Publication Data

US 2017/0219354 A1 Aug. 3, 2017

Related U.S. Application Data

(60) Provisional application No. 62/290,582, filed on Feb. 3, 2016.

(51) Int. Cl.
G01C 21/20 (2006.01)
H04R 3/00 (2006.01)
G06Q 10/08 (2012.01)
G01S 1/68 (2006.01)
H04W 88/02 (2009.01)

(52) U.S. Cl.
CPC ........... *G01C 21/206* (2013.01); *G01C 21/20* (2013.01); *G01S 1/68* (2013.01); *G06Q 10/087* (2013.01); *H04R 3/005* (2013.01); *H04W 88/02* (2013.01); *H04R 2430/20* (2013.01)

(58) Field of Classification Search
CPC ........... G01C 21/20; G01S 1/68; H04W 88/02
See application file for complete search history.

(56) References Cited

U.S. PATENT DOCUMENTS

| 5,295,064 | A | 3/1994 | Malec |
| 7,072,766 | B2 | 7/2006 | Kato |
| 7,562,729 | B2 | 7/2009 | Hammerle |
| 8,140,379 | B2 | 3/2012 | Anand |
| 8,239,277 | B2 | 8/2012 | Lee |
| 8,606,501 | B2 | 12/2013 | Hannah |
| 2004/0221790 | A1 | 11/2004 | Sinclair |
| 2008/0147461 | A1* | 6/2008 | Lee ...................... G01C 21/206 705/7.34 |
| 2013/0098700 | A1 | 4/2013 | Zhang |

* cited by examiner

*Primary Examiner* — Todd Melton
(74) *Attorney, Agent, or Firm* — Fitch, Even, Tabin & Flannery LLP

(57) ABSTRACT

Systems, apparatuses and methods are provided herein for tracking carts in a shopping space. A system for tracking carts in a shopping space comprises: a sound sensor array, a cart location database storing location information and sound profiles associated with a plurality of shopping cart identifiers, and a control circuit configured to: identify a cart sound made by a movement of a shopping cart traveling in the shopping space, determine a current location of the shopping cart based on the cart sound, match the shopping cart to a shopping cart identifier in the cart location database, update the location information associated the shopping cart identifier in the cart location database based on the current location of the shopping cart; and update the sound profile of the shopping cart identifier based on the cart sound captured by the sound sensor array.

25 Claims, 4 Drawing Sheets

APPARATUS AND METHOD FOR TRACKING CARTS IN A SHOPPING SPACE

CROSS-REFERENCE TO RELATED APPLICATION

This application claims the benefit of U.S. Provisional Application No. 62/290,582, filed Feb. 3, 2016, which is incorporated herein by reference in its entirety.

TECHNICAL FIELD

This invention relates generally to in-store activity monitoring.

BACKGROUND

Most grocery stores offer shopping carts that customers can use while they are shopping in the store. These shopping carts generally have a basket portion, a handle, and wheels.

BRIEF DESCRIPTION OF THE DRAWINGS

Disclosed herein are embodiments of apparatuses and methods for tracking carts in a shopping space. This description includes drawings, wherein.

Figure 1:
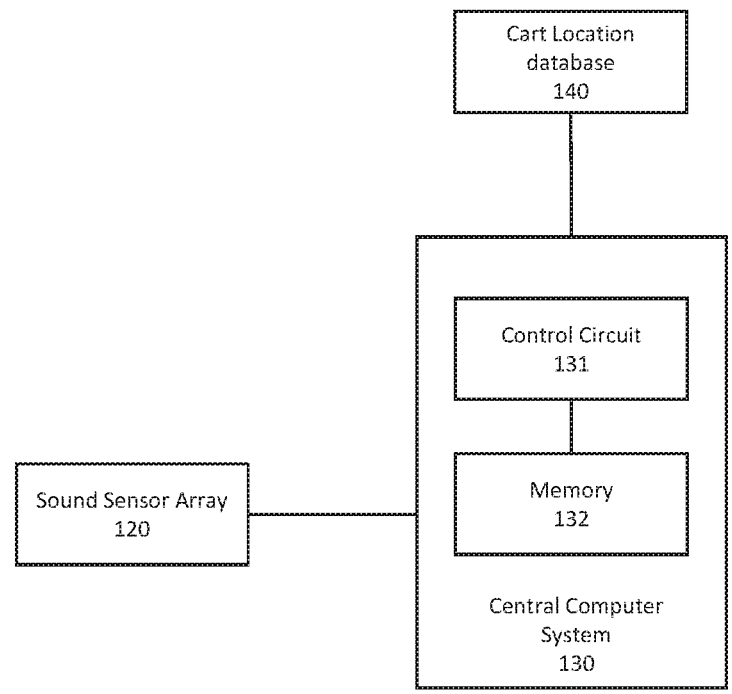
FIG. 1 is a block diagram of a system in accordance with several embodiments.
Figure 1:
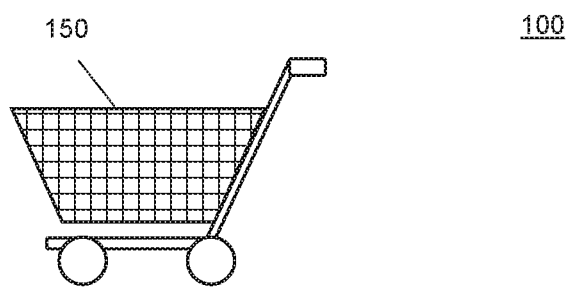

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for tracking carts in a shopping space. A system for tracking carts in a shopping space comprises: a sound sensor array covering at least a portion of the shopping space, a cart location database storing location information and sound profiles associated with a plurality of shopping cart identifiers, and a control circuit coupled to the sound sensor array and the cart location database. The control circuit being configured to: identify, in sounds captured by the sound sensor array, a cart sound made by a movement of a shopping cart traveling in the shopping space, determine a current location of the shopping cart based on the cart sound, match the shopping cart to a shopping cart identifier in the cart location database based at least on comparing the current location of the shopping cart to the location information of the plurality of shopping cart identifiers, update the location information associated the shopping cart identifier in the cart location database based on the current location of the shopping cart, and update the sound profile of the shopping cart identifier based on the cart sound captured by the sound sensor array.

Typically, paths that customers take while shopping in a store are not known to the store operator. Knowledge of where customers go and what they place in shopping carts can be reviewed to improve store layout and product placement. In some embodiments, the locations and traffic patterns of shopping carts can be tracked by placing sound sensors around the sales floor to record the distinct sound of rolling shopping carts. In some embodiments, additional emitters may be placed on shopping carts to generate unique sounds to distinguish different carts. In some embodiments, the sounds detected by the sensors may be inside and/or outside of human hearing ranges. In some embodiments, locations of carts may be calculated based on directional sound detection and/or triangulation from the positions of sound sensor devices in a sound sensor array. The system may then determine frequently used paths, dwell times at different locations, point of sale (POS) processing time, basket contents, speed of shopping, and/or where work is being completed, etc. in the shopping space based on tracking the shopping carts. The system may further trigger actions for locations that are heavily shopped and may need customer service (e.g. more deli associates, more cashiers, more produce rotation, etc.). In some embodiments, if a cart dwells or travels all around the produce section but the baskets do not contain produce at check out, an associate may be notified to clean and cull or stock in the produce section.

Referring now to FIG. 1, a system for tracking carts in a shopping space is shown. The system 100 includes a central computer system 130, a cart location database 140, and a sound sensor array 120 for detecting sounds from shopping carts 150.

The sound sensor array 120 may generally be configured to capture sounds in a shopping space and transmit the sound to the central computer system 130. In some embodiments, the sound sensor array 120 may comprise an array of sound sensor devices positioned throughout a shopping space. The sound sensor array 120 may comprise stationary sound sensors installed in the shopping space. For example, the sound sensor array 120 may be installed in the ceiling, pillars, beams, modules, display shelves, etc. of a shopping space. In some embodiments, the sound sensor array 120 may comprise sound sensor devices tuned to a narrow band of the frequencies associated with sound frequencies typically generated by the movement of shopping carts. In some embodiments, the sound sensor array 120 may comprise one or more directional microphones including a plurality of microphone devices each pointing away from a center of the device in a different direction. The times that a sound reaches each of the microphones in the directional microphone device may be compared to determine a direction of the sound source relative to the directional microphone.

The central computer system 130 includes a control circuit 131 and a memory 132 and may generally be any processor-based device such as one or more of a computer system, a server, a networked computer, a cloud-based server, etc. The control circuit 131 may comprise a central processing unit, a processor, a microprocessor, and the like. The control circuit 131 may be configured to execute computer readable instructions stored on the memory 132. The memory 132 may comprise volatile and/or non-volatile computer readable storage memory and have stored upon it a set of computer readable instructions which, when executed by the control circuit 131, causes the system to update locations of shopping carts in a shopping space based on sound detected by the sound sensor array 120. The central computer system 130 may be coupled to the sound sensor array 120 via a wired and/or wireless signal connections. In some embodiments, the central computer system 130 may be configured to process the sound collected by the sound sensor array 120 to isolate sounds made by shopping carts 150. The central computer system 130 may then be configured to identify a location of the shopping cart 150. The identification of the location of the shopping cart 150 may be determined based on one or more of the location of the sound source and the detected sound's characteristics (e.g. frequency, tone, modulation, amplitude, duration, etc.) as compared to stored sound profiles of carts being tracked. The location of the sound source may be determined based on performing trilateration and/or triangulation for the position of the shopping cart 150 using sounds captured by two or more directional and/or non-directional sound sensor devices of the sound sensor array 120 that are spaced apart. In some embodiments, the central computer system 130 may further be configured to determine whether the detected sound is associated with an item being added to the shopping cart 150 based on the characteristics of the sound. In some embodiments, item(s) added to the cart may cause a change in the sound produced by the shopping cart 150 as it travels around the store. In some embodiments, when an item is placed into the shopping cart 150, a downward motion of the shopping cart may produce a distinguishable sound. The central computer system 130 may determine the location and/or time associated with each instance that an item is added to the shopping cart 150. In some embodiments, the central computer system 130 may further determine a path of the shopping cart 150 based on a history of tracked locations.

In some embodiments, the central computer system 130 may be configured to automatically generate one or more alerts and/or tasks based on the tracked location(s) and/or route(s) of shopping cart(s). For example, the central computer system 130 may determine one or more heavily trafficked areas and instruct a motorized unit and/or a store associate to survey the area to ensure the area is clean and/or sufficiently stocked. In another example, the central computer system 130 may determine one or more areas with unusually low traffic and instruct a motorized unit and/or a store associate to investigate for the presence of spills or other types of obstructions. In some embodiments, the central computer system 130 may match the shopping cart identifier with a checkout receipt based on the time that the shopping cart approaches a checkout terminal. The central computer system 130 may then compare the items purchased during that shopping trip with the route and the dwell time of the shopping trip. If the shopping cart dwells at a section of the store for an extended period of time but no item from that section of the store is purchased, the system may mark the section as a section that needs attention. In some embodiments, the system may aggregate a plurality of shopping cart routes to determine sections needing attention and/or possible modification. Generally, shopping cart locations determined based on the sound collected by the sound sensor array 120 may be used to map out and analyze usage and traffic of different areas of a shopping space over time to provide a better understanding of customer shopping patterns and habits.

The cart location database 140 generally comprises volatile and/or non-volatile computer readable storage memory device(s). While the cart location database 140 is shown as a separate component from the memory 132 of the central computer system 130 in FIG. 1, in some embodiments, the cart location database 140 and the memory 132 may be implemented with the same one or more memory devices.

The cart location database 140 may generally store the last known location and a location history for one or more shopping carts in a shopping space. In some embodiments, the cart location database 140 may further store sound profiles for each of the carts being tracked. In some embodiments, when a shopping cart 150 leaves a cart storage and/or retrieval area, a new cart identifier may be created and/or assigned in the cart location database 140. The system may record the initial sound characteristics of the shopping cart 150 to create a sound profile for the shopping cart identifier and store it in the cart location database and/or another database. When the system detects a cart sound at a new location, the system may compare the location and the sound characteristics of the captured sound with the stored cart locations and sound profiles to determine which shopping cart identifier of the cart being tracked matches the detected cart sound. In some embodiments, the comparison may comprise selecting the most likely match. For example, the system may first select cart identifiers with a previous location in proximity of the location of the detected sound and then compare the sound profiles associated each cart identifier with the captured sound to find the closest sound profile match. Once a match is determined, the system may update the last known location and/or the sound profile of the matched shopping cart identifier with the location and the sound characteristics of the detected sound in the cart location database 140. In some embodiments, this process may be repeated for a cart identifier stored in the cart location database 140 until the cart is detected to have been returned to a cart storage and/or retrieval area or abandoned.

The shopping cart 150 may generally be any moveable item container configured to travel in a shopping space. A shopping cart 150 may comprise one or more of: a basket portion, a frame, a set of wheels, a child seat portion, a bottom tray portion, a swinging rear opening, etc. When a shopping cart 150 is pushed or pulled in a shopping space, one or more components of the shopping cart 150 may generate a sound due to the cart's movement. For example, if the dirt or debris is caught in the wheels of the shopping cart 150, the shopping cart 150 may shake and/or rattle according to the condition of the wheels as it is pushed or pulled. The movement of the cart may cause a component of the shopping cart to emit sounds through striking, scraping, and/or rubbing with another part of the shopping cart and/or with other objects such as the floor of the shopping space and/or objects placed on the cart. For example, cart sounds may comprise one or more of sounds made by the rubbing of the axle of one or more wheels in the socket of the axle, the rolling of wheels on the floor, the vibration of items in the basket portion, the rattling of the folding seat portion against the frame of the cart, the rattling of the rear opening against the basket portion and/or the frame, etc. Generally, cart sounds may comprise sounds produced by the body of the shopping cart due to motions of the cart as it travels in the shopping space. In some embodiments, the shopping cart 150 may further include a passive sound maker device. For example, a sound plate, a sound brush, or a clicker may be positioned near a wheel of the cart and be configured to be actuated with the rotation of the wheel. In some embodiments, as a cart is used, sounds made by the movement of the cart may change due to one or more of: the condition of the components of the cart, the items placed in the cart, and the ground that the cart is traveling on. The system may be configured to constantly update the locations and sound profiles associated with each shopping cart being tracked to account for the changes in each cart's sound characteristic over time. While a standard one basket type shopping cart is shown in FIG. 1, in some embodiments, the system disclosed herein can also track other types of shopping carts such as two basket type shopping carts, flatbed shopping carts, motorized shopping carts, foldable shopping carts, etc.

Figure 2:
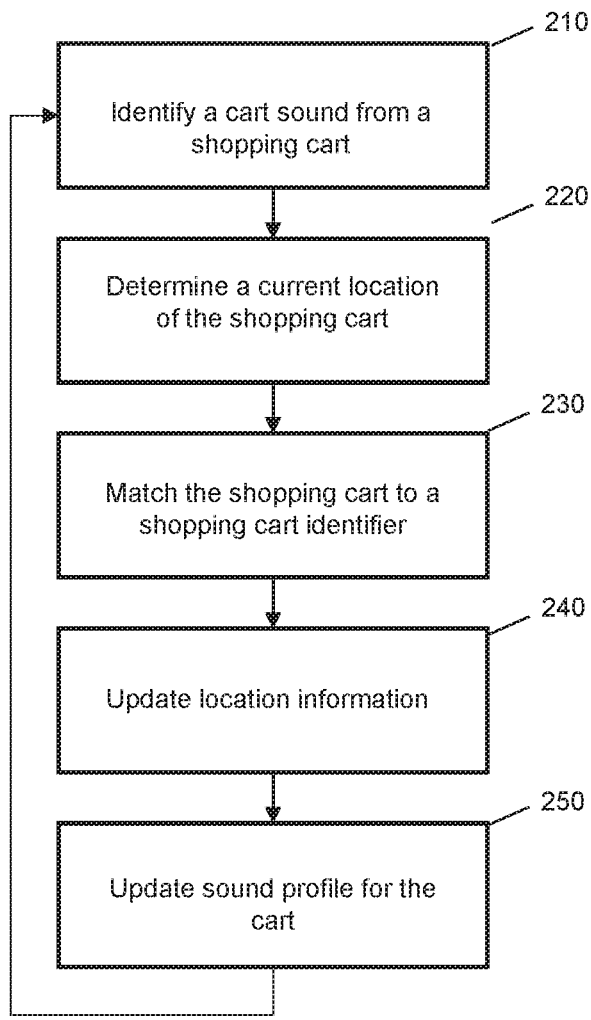
FIG. 2 is a flow diagram of a method in accordance with several embodiments.

Referring now to FIG. 2, a method for tracking shopping carts in a shopping space is shown. Generally, the method shown in FIG. 2 may be implemented with a processor based device such as a control circuit, a central processor, and the like. In some embodiments, the method shown in FIG. 2 may be implemented with the central computer system 130 in FIG. 1.

In step 210, the system identifies a cart sound in the sounds captured by a sound sensor array in a shopping space. In some embodiments, the sound sensor array may comprise the sound sensor array 120 described with reference to FIG. 1. The sound sensor array may generally be configured to capture sounds produced by the movement of shopping carts and transmit the sound to a central computer system. In some embodiments, the sound sensor array may comprise an array of sound sensor devices positioned throughout a shopping space. The sound sensor array may comprise stationary sound sensors installed in the shopping space. For example, the sound sensor array may be installed in the ceiling, pillars, beams, modules, display shelves, etc. of a shopping space. In some embodiments, the sound sensor array may comprise one or more directional microphones configured to determine the direction of a sound source relative to the directional microphone.

The identified cart sound may generally correspond to sounds made by a shopping cart due to a movement of the shopping cart. In some embodiments, the movement of the cart may cause one or more components of the shopping cart to emit sounds through striking, scraping, and/or rubbing with another part of the shopping cart and/or with other objects such as the floor of the shopping space and/or objects placed on the cart. In some embodiments, as a cart is used, cart sound may be change due to one or more of: the condition of the components of the cart, the items placed in the cart, and the ground that the cart is traveling on. In some embodiments, the shopping cart may further include a passive sound maker device configured to generate a sound in response to the movement of the shopping cart. In some embodiments, the shopping cart may comprise one or more of one basket type shopping carts, two basket type shopping carts, flatbed shopping carts, motorized shopping carts, foldable shopping carts, etc.

In some embodiments, the system may be configured to determine a baseline noise profile of the shopping space and remove a baseline noise from the sound captured by the sound sensor array to detect sounds produced by the movement of shopping carts. In some embodiments, the baseline noise profile may be generated and/or updated by capturing the ambient noise of the shopping space with the sound sensors. In some embodiments, the system may be configured to filter the sound captured by the sound sensor to isolate sounds matching typical sound characteristics profiles of shopping carts. For example, the captured sound may be filtered to remove all sounds outside of the frequencies typically associated with movements of shopping carts. In some embodiments, the system may be configured to determine whether a sound is produced by a shopping cart based one or more of the frequency, the tone, the modulation, the amplitude, and the duration of the captured sound.

In some embodiments, the system may also be configured to identify sounds associated with items placed into the shopping cart. For example, the system may detect a change in the sound produced by a shopping cart that is associated with the cart carrying more weight and determine that one or more items have been added to the cart. In another example, the downward movement of the basket portion of the shopping cart caused by an item dropped into the basket portion may produce a distinguishable sound that may be detected and recorded by the central computer system.

In step 220, the system determines a current location of the shopping cart based on the cart sound identified in step 210. In some embodiments, the system may be configured to determine a location of the sound source based on the locations of sound sensors in the sound sensor array that detected the cart sound. In some embodiments, the system may be configured to determine a sound source location based on trilateration and/or triangulation from the locations of two or more sound sensor devices. For example, if the two sensor sensors spaced apart from each other detect a sound having a matching characteristic, the system may be configured to determine an estimated distance and/or angle between the sound source and each sound device based on the relative arrival time and/or amplitude of the sound detected at each sound sensor. In some embodiments, a direction of the sound source may be determined with:

$$\Delta t = \frac{x \sin\theta}{c},$$

in which $\Delta t$ represents arrival time difference, x represents the distance between the two sound sensors, c represents the speed of sound, and $\theta$ may be solved for the angle between the baseline of the sensors and the incident sound. In some embodiments, the determined angle from multiple sensors may be used to triangulate a point in the shopping space based on the locations of the sound sensors. In some embodiments, the system may use the amplitude of the cart sound as captured by three or more sound sensors to estimate the sound source's distances to each of the sound sensors. A location may then be estimated based on the distances from each sound sensor.

In some embodiments, the location of the sound source may be determined based at least partially on trilateration. For example, the distances between each of the sound source and each sound sensor may be determined based on the difference in time of arrival of the detected cart sound. For example, if a sound arrives at the first sound sensor device at $t_1$ and at the second sound sensor device at $t_2$ before $t_1$, and the distance between the first and second sound sensors is $d_3$, the distance between the sound source and the first sound sensor ($d_1$) may be solved from $d_1^2 = d_3^2 + (d_1 - (t_1 - t_2)c)^2$, assuming that the distance between the sensors $d_3$ is smaller than $d_1$. The distance between the second sensor and the sound source may be represented by $d_2 = d_1 - (t_1 - t_2)c$. With $d_2$ and $d_1$, the system may determine a circle of possible points for the sound source. If the shopping carts are generally assumed to be on plane a few feet above the floor of the shopping space, the intersection of the plane and the circle of possible points may yield two possible locations for the sound source. In some embodiments, the system may similarly calculate the distance between the sound source and a third sound sensor device to triangulate and narrow down the location of the sound source.

In some embodiments, the sound sensor array may comprise one or more directional microphones having a plurality of microphones pointed in different directions. The system may determine the direction of the sound source based on the time of arrival and/or sound amplitude at each microphone device in the directional microphone. For example, the sound would first arrive at the microphone device pointed most directly at the sound source. The system may then determine a point in the shopping space based on the direction and/or distance of the sound source detected by two or more directional microphones based on either triangulation or trilateration. In some embodiments, the system may have stored in its memory a map of the shopping space indicating pathways that shopping carts may travel. The system may use the map to further narrow down the possible locations of the sound source.

In step 230, the shopping cart is matched to a shopping cart identifier in a shopping cart location database. The cart location database may generally store the last known location of one or more shopping carts in a shopping space. In some embodiments, when a shopping cart leaves a cart storage area, a new cart identifier may be created in the cart location database.

In some embodiments, the system may compare the location of the cart sound determined in step 220 to the last known locations of carts tracked in the cart location database to match the detected shopping cart to a tracked shopping cart. For example, the detected shopping cart may be matched to a tracked shopping cart identifier based on one or more of the proximity of the detected location and the last known location, a previously detected direction of travel of the shopping cart identifier, and a previously detected speed of travel of the shopping cart identifier. In some embodiments, the cart location database may store a history of locations for each tracked shopping cart identifier and only match the shopping cart identifier to a detected shopping cart if the current location could be a logical next location based on the location history. For example, the route distance between the last known location and the detected location must be a distance that can be reasonably covered within the time span.

In some embodiments, if two or more possible shopping cart identifier matches are found based on location information alone, the system may compare the sound characteristics of the sound identified in step 210 with sound profiles associated with the matching cart identifiers to select one of the shopping cart identifiers as the match. For example, if two shopping carts cross paths, the system may distinguish the two carts from each other when their paths diverge based on comparing the captured sound of carts heading in different directions with sound profiles associated with the cart identifiers. In some embodiments, the sound profiles may comprise a recording of one or more previously recorded sounds from the tracked shopping cart and/or one or more of the frequency, the tone, the modulation, the amplitude, and the duration data of the cart sound. In some embodiments, the sound profile may correspond to a combination of sounds of different frequencies, tones, modulations, relative amplitudes, and durations. For example, the sound profile may comprise sounds made by two or more of the axle of one or more wheels, the basket portion, the folding seat portion, the swinging area opening, a passive sound device, etc. of the cart. In some embodiments, the recorded sound may further comprise sound produced by a passive sound maker device. The sound made by the movement of a shopping cart typically changes with time and use. As a cart is pushed around in a shopping space, the sound made by the cart may change due to one or more of: the condition of the components of the cart, the items placed in the cart, and the ground that the cart is traveling on. For example, debris and dirt may become attached to or detached from the wheels of the shopping cart and cause the cart sound to change as it travels. In another example, cart sound may change depending on the weight of the items in the basket of the cart. In some embodiments, the system may match the detected sound to a sound profile with the most similar sound characteristics without requiring the sounds to be identical to determine a match. For example, the system may first narrow down the possible shopping cart identifiers based on location, and then select the shopping cart identifier having a profile that is the most similar to the detected cart sound as the match. In some embodiments, the sound profile may comprise a history of captured sounds, and the captured sound may be compared to the characteristics of one or more previously captured sound instances. In some embodiments, the system may compare both the current location and the captured sound with the locations and sound profiles of tracked shopping carts in the cart location database. The system may only determine a match between a detected shopping cart sound and a tracked shopping cart identifier if both the current location and the sound characteristic of the captured cart sound are a close enough matches to the last known location(s) and the sound profile of the shopping cart identifier.

In some embodiments, if the current location of the shopping cart is determined to be near an exit of a cart retrieval area and the sound profile of the detected cart sound does not match a stored cart identifier with a last known location in proximity of the area, the system may create a new shopping identifier in the cart location database to begin tracking a new shopping trip.

In step 240, the location information of the shopping cart identifier matched in step 230 is updated with the current location of the shopping cart determined in step 220. In some embodiments, the system may maintain a location history of the shopping cart associated with the shopping cart identifier and the current location may be added to the location history. After step 240, the current location may be used as a last known location for further matches. Generally, in some embodiments, the current location, the last known location, and the location history of the shopping cart may be represented as areas, sections, and/or coordinate (s) within the shopping space. In some embodiments, the location information may further include a timestamp such that the system records the shopping cart's speed and dwell time at each location along the route.

In step 250, the sound profile of the shopping cart identifier matched in step 230 is updated with the cart sound captured and identified in step 210. In some embodiments, the system may track a history of changing carts sounds, and the captured cart sound may be added to the sound profile. In some embodiments, the captured sound may replace the previously recorded sound as the sound profile. In some embodiments, the sound profile may be at least partially modified based on the captured sound. The updated sound profile may then be used for matching the shopping cart identifier to subsequently detected cart sounds.

After step 250, steps 210-250 may be repeated for each instances of detected cart sound to track the location history of a plurality of shopping cart identifiers. By repeating this process, the system may constantly track and update locations of a plurality of shopping carts in the shopping space based on their location history and changing sound characteristics.

In some embodiments, after step 250, if the last known location of the shopping cart is near an opening of a cart storage area, and no activity of the shopping cart is detected for a set period of time, the system may determine that a shopping trip has concluded and the cart has been returned to the storage area by a customer or an associate. In some embodiments, the system may also determine that a shopping trip has ended if the shopping cart leaves the sales floor and/or is brought into a parking area. The system may then "close" the shopping trip and stop the updating of locations and sound profiles for the shopping cart identifier. In some embodiments, the system may close the shopping trip of any cart that enters the storage and/or retrieval area. The location history of the shopping cart identifier may be used to map out a shopping trip route for analysis. For example, the location history may include time stamps that track how fast the shopping cart is traveling at a given time and the dwell times at each stop along the route. In some embodiments, the system may further be configured to identify a distinct sound and/or sound changes associated with items being placed into the shopping cart and record each instance of items being placed into the shopping cart on the route. The system may then determine the sections from which the customer has taken items to place into the shopping cart.

In some embodiments, the routes of shopping carts may be analyzed by the system to generate one or more alerts and/or tasks. For example, the system may determine one or more heavy traffic areas and instruct a motorized unit and/or a store associate to survey the area to ensure the area is clean and/or sufficiently stocked. In another example, the system may determine one or more areas with unusually low traffic and instruct a motorized unit and/or a store associate to investigate for the presence of spills or other type of obstructions. In some embodiments, the system may match the shopping cart identifier with a checkout receipt based on the time that the shopping cart approaches a checkout terminal. The system may then compare the items purchased during that shopping trip with the route and the dwell time of the shopping trip. If the shopping cart dwells at a section for a set period of time but no item from that section of the store is purchased, the system may mark the section as a section needing attention. In some embodiments, the system may aggregate a plurality of shopping cart routes to determine sections needing attention. In some embodiments, the system may further provide a user interface for viewing and analyzing the tracked routes of the shopping carts. In some embodiments, the system may cause user interfaces on user devices to display alerts and/or task assignments based on the analysis of the tracked routes of the shopping carts.

Figure 3:
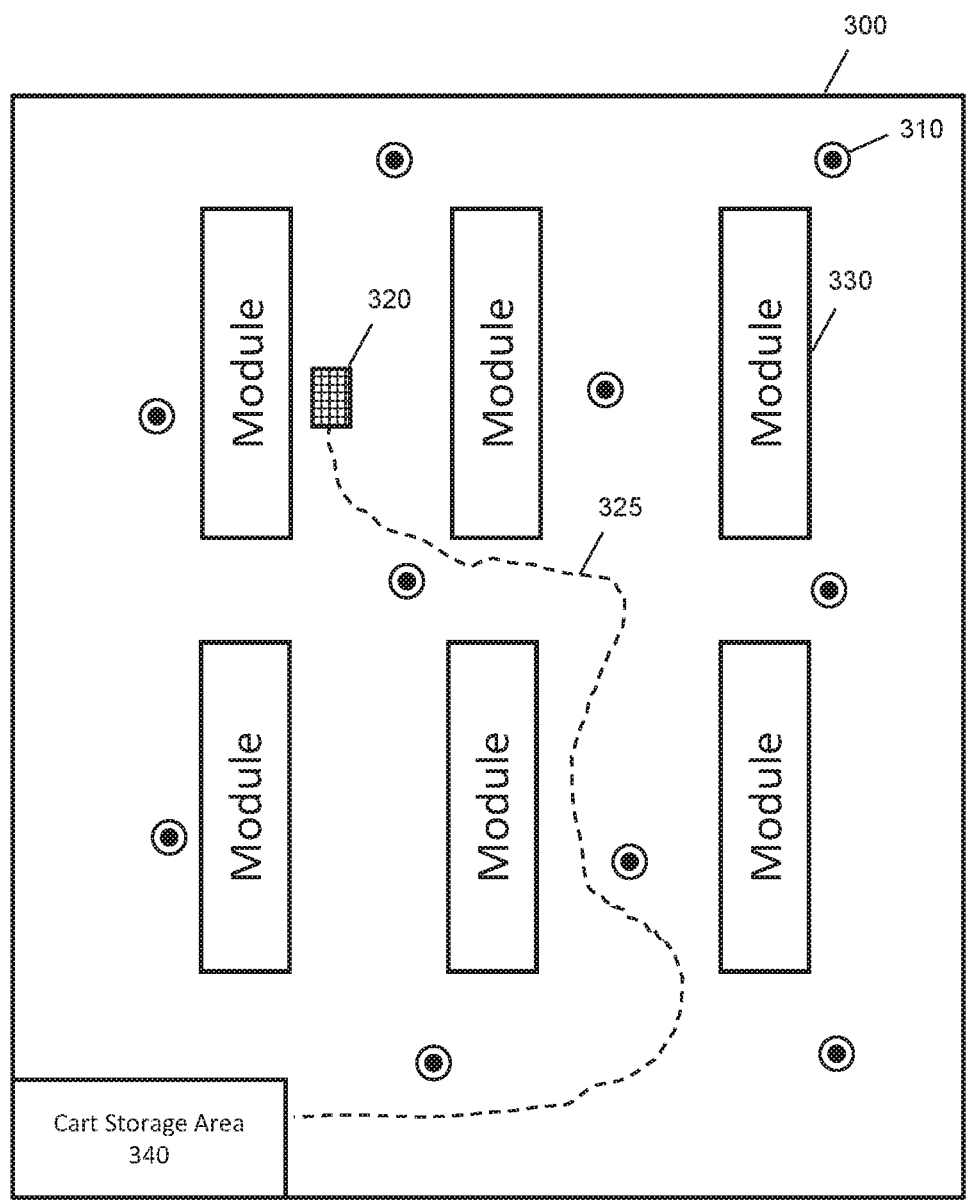
FIG. 3 is an illustration of a shopping space in accordance with several embodiments.

Next referring to FIG. 3, an illustration of a shopping space according to some embodiments is shown. The shopping space 300 comprises a plurality of display modules 330, a cart storage area 340, and a plurality of sound sensors 310 positioned throughout the shopping space. When a shopping cart 320 leaves a cart storage area 340, the system may assign a shopping cart identifier to the shopping cart 320 and record an initial sound profile for the shopping cart identifier. When one or more of the sound sensors 310 detects a cart sound, the system may determine a location of the cart sound based on one or more of triangulation and/or trilateration. The system then determines whether the detected cart sound matches the sound profile of a stored shopping cart identifier. If a match is found, the location of the cart sound is added to the tracked route of the shopping cart 320 and the sound profile of the shopping cart identifier is updated with the newly captured cart sound. Over time, the system may continuously update the location history and the sound profile of the shopping cart 320 and map out a route 325 of the shopping cart 320. In some embodiments, each location point on the route 325 may include a time stamp that the system records the speed and dwell time of the shopping cart 320 at each location along the route. In some embodiments, the system may further detect for sounds associated with items being added to the shopping cart and/or sound changes associated with an increase in the weight of items being carried by the shopping cart. The system may then also record locations along the path that items are added to the shopping cart. The system may similarly track a plurality of shopping carts in the shopping space 300 and record traffic patterns in the shopping space 300 over time.

Figure 4A:
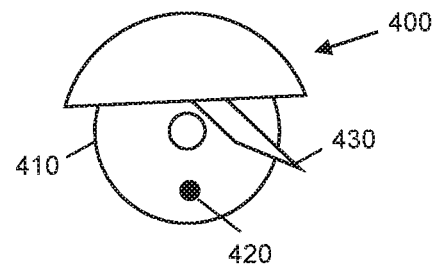
FIGS. 4A, 4B, and 4C are illustrations of a passive sound maker device in accordance with several embodiments.
Figure 4B:
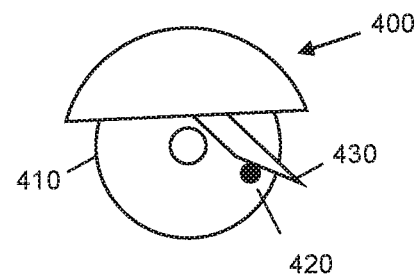
Figure 4C:
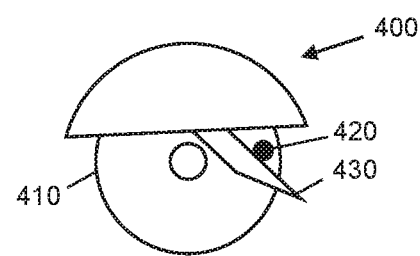

Next referring to FIGS. 4A-C, a passive sound maker device according to some embodiments is shown. The passive sound maker 400 comprises a sound maker 430 and an actuator 420 integrated with a wheel 410 of a shopping cart. The sound maker 430 may be any material configured to make a sound when contacted by the actuator 420. In some embodiments, the sound maker 430 may be a brush, a plate, a foil, a clicker, etc. In some embodiments, the sound maker 430 may be configured to flex or bend as to minimize interfering with the rotation of the wheel 410. The actuator 420 may comprise a protrusion from the wheel 410 and configured to rotate with the wheel 410. As the wheel 410 rotates from the position shown in FIG. 4A to the position shown in FIG. 4B, the actuator 420 contacts the sound maker 430 to produce a sound. The sound maker 430 may then flex or bend to allow the actuator 420 to pass through as the wheel 410 continues to rotate into the position shown in FIG. 4C. In some embodiments, the sound maker 430 may also be configured to generate a sound when the wheel rotates in the opposite direction (e.g. FIG. 4C to 4A).

In one embodiment, a system for tracking carts in a shopping space comprises: a sound sensor array covering at least a portion of the shopping space, a cart location database storing location information and sound profiles associated with a plurality of shopping cart identifiers, and a control circuit coupled to the sound sensor array and the cart location database. The control circuit being configured to: identify, in sounds captured by the sound sensor array, a cart sound made by a movement of a shopping cart traveling in the shopping space, determine a current location of the shopping cart based on the cart sound, match the shopping cart to a shopping cart identifier in the cart location database based at least on comparing the current location of the shopping cart to the location information of the plurality of shopping cart identifiers, update the location information associated with the shopping cart identifier in the cart location database based on the current location of the shopping cart, and update the sound profile of the shopping cart identifier based on the cart sound captured by the sound sensor array.

In one embodiment, a method for tracking carts in a shopping space comprises: identifying, in sounds captured by a sound sensor array covering at least a portion of the shopping space, a cart sound made by a movement of a shopping cart traveling in the shopping space, determining, by a control circuit coupled to the sound sensor array, a current location of the shopping cart based on the cart sound, matching, by the control circuit, the shopping cart to a shopping cart identifier in a cart location database storing location information and sound profiles associated with a plurality of shopping cart identifiers, based at least on comparing the current location of the shopping cart to the location information of the plurality of shopping cart identifiers, updating, by the control circuit, the location information associated with the shopping cart identifier in the cart location database based on the current location of the shopping cart, and updating, by the control circuit, the sound profile of the shopping cart identifier based on the cart sound captured by the sound sensor array.

In one embodiment, a system for tracking carts in a shopping space comprises: a sound sensor array covering at least a portion of the shopping space, a cart location database storing location information and sound profiles associated with a plurality of shopping cart identifiers, and a control circuit coupled to the sound sensor array and the cart location database. The control circuit being configured to: identify, in sounds captured by the sound sensor array, a plurality of cart sounds made by movements of a plurality of shopping carts traveling in the shopping space, determine current locations of each of the plurality the shopping carts based on an associated cart sound, match each of the plurality of the shopping carts to a shopping cart identifier in the cart location database based at least on comparing the current location of each of the plurality of shopping carts to the location information of the plurality of shopping cart identifiers and cart sounds of each of the plurality of shopping carts to sound profiles of the plurality of shopping cart identifiers; and for each shopping cart identifier matched with one of the plurality of shopping carts: update the location information associated with the shopping cart identifier in the cart location database based on the current location of the one of the plurality of shopping cart; and update the sound profiles of the shopping cart identifier based on the cart sound of the one of the plurality of shopping cart.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for tracking carts in a shopping space comprising:
   a sound sensor array covering at least a portion of the shopping space;
   a cart location database storing location information and sound profiles associated with a plurality of shopping cart identifiers; and
   a control circuit coupled to the sound sensor array and the cart location database, the control circuit being configured to:
     identify, in sounds captured by the sound sensor array, a cart sound made by a movement of a shopping cart traveling in the shopping space;
     determine a current location of the shopping cart based on the cart sound;
     match the shopping cart to a shopping cart identifier in the cart location database based at least on comparing the current location of the shopping cart to the location information of the plurality of shopping cart identifiers;
     update the location information associated with the shopping cart identifier in the cart location database based on the current location of the shopping cart; and
     update the sound profile of the shopping cart identifier based on the cart sound captured by the sound sensor array.

2. The system of claim 1, wherein the shopping cart is matched to the shopping cart identifier further based on comparing the cart sound of the shopping cart with the sound profiles of the plurality of shopping cart identifiers.

3. The system of claim 1, wherein the shopping cart is matched to the shopping cart identifier further based on comparing the current location of the shopping cart with a direction of travel associated with the plurality of shopping cart identifiers.

4. The system of claim 1, wherein the cart sound corresponds to a sound produced by one or more of a wheel and a frame of the shopping cart.

5. The system of claim 1, wherein the sound sensor array comprises a plurality of sound sensors positioned throughout the shopping space.

6. The system of claim 1, wherein the sound sensor array comprises a plurality of directional microphones.

7. The system of claim 1, wherein the current location of the shopping cart is determined based on triangulating with locations of two or more sensors of the sound sensor array which captured the cart sound and magnitudes of the cart sound captured by the two or more sensors of the sound sensor array.

8. The system of claim 1, wherein the control circuit is further configured to: determine a route associated with the shopping cart identifier based on the location information over time.

9. The system of claim 1, wherein the control circuit is further configured to: determine a dwell time of the shopping cart at one or more locations based on the location information over time.

10. The system of claim 1, wherein the control circuit is further configured to:
    detect the shopping cart leaving a cart retrieval area;
    capture a sound associated with the shopping cart and determine an initial sound profile for the shopping cart; and
    associate the initial sound profile and a location of the shopping cart with a new shopping cart identifier.

11. The system of claim 1, wherein the movement of the shopping cart comprises a downward movement caused by an item placed into the shopping cart.

12. The system of claim 1, wherein the shopping cart comprises a passive sound device configured to make a sound when actuated by the movement of the shopping cart.

13. A method for tracking carts in a shopping space comprising:
    identifying, in sounds captured by a sound sensor array covering at least a portion of the shopping space, a cart sound made by a movement of a shopping cart traveling in the shopping space;
    determining, by a control circuit coupled to the sound sensor array, a current location of the shopping cart based on the cart sound;
    matching, by the control circuit, the shopping cart to a shopping cart identifier in a cart location database storing location information and sound profiles associated with a plurality of shopping cart identifiers, based at least on comparing the current location of the shopping cart to the location information of the plurality of shopping cart identifiers;

updating, by the control circuit, the location information associated the shopping cart identifier in the cart location database based on the current location of the shopping cart; and updating, by the control circuit, the sound profile of the shopping cart identifier based on the cart sound captured by the sound sensor array.

14. The method of claim 13, wherein matching the shopping cart to the shopping cart identifier further comprises: comparing the cart sound of the shopping cart with the sound profiles of the plurality of shopping cart identifiers.

15. The method of claim 13, wherein matching the shopping cart to the shopping cart identifier further comprises: comparing the current location of the shopping cart with a direction of travel associated with the plurality of shopping cart identifiers.

16. The method of claim 13, wherein the cart sound corresponds to a sound produced by one or more of a wheel and a frame of the shopping cart.

17. The method of claim 13, wherein the sound sensor array comprises a plurality of sound sensors positioned throughout the shopping space.

18. The method of claim 13, wherein the sound sensor array comprises a plurality of directional microphones.

19. The method of claim 13, wherein determining the current location of the shopping cart comprise: triangulating with locations of two or more sensors of the sound sensor array which captured the cart sound and magnitudes of the cart sound captured by the two or more sensors of the sound sensor array.

20. The method of claim 13, further comprising: determining a route associated with the shopping cart identifier based on the location information over time.

21. The method of claim 13, further comprising: determining a dwell time of the shopping cart at one or more locations based on the location information over time.

22. The method of claim 13, further comprising:
detecting the shopping cart leaving a cart retrieval area;
capturing a sound associated with the shopping cart and determine an initial sound profile for the shopping cart; and
associating the initial sound profile and a location of the shopping cart with a new shopping cart identifier.

23. The method of claim 13, wherein the movement of the shopping cart comprises a downward movement caused by an item placed into the shopping cart.

24. The method of claim 13, wherein the shopping cart comprises a passive sound device configured to make a sound when actuated by the movement of the shopping cart.

25. A system for tracking carts in a shopping space comprising:

a sound sensor array covering at least a portion of the shopping space;

a cart location database storing location information and sound profiles associated with a plurality of shopping cart identifiers;

a control circuit coupled to the sound sensor array and the cart location database, the control circuit being configured to:

identify, in sounds captured by the sound sensor array, a plurality of cart sounds made by movements of a plurality of shopping carts traveling in the shopping space;

determine current locations of each of the plurality of shopping carts based on an associated cart sound;

match each of the plurality of shopping carts to a shopping cart identifier in the cart location database based at least on comparing the current location of each of the plurality of shopping carts to the location information of the plurality of shopping cart identifiers and cart sounds of each of the plurality of shopping cart to sound profiles of the plurality of shopping cart identifiers; and for each shopping cart identifier matched with one of the plurality of shopping carts:

update the location information associated with the shopping cart identifier in the cart location database based on the current location of the one of the plurality of shopping cart; and update a sound profile of the shopping cart identifier based on a cart sound of the one of the plurality of shopping cart.

* * * * *